United States Patent [19]

Koos, Jr. et al.

[11] Patent Number: 4,591,846

[45] Date of Patent: May 27, 1986

[54] REAL TIME CELL SPECIFICATION PROCESSOR

[75] Inventors: William M. Koos, Jr.; Timothy R. Geis, both of Orlando; Richard M. Rudy, Jr., Longwood, all of Fla.

[73] Assignee: Burroughs Corp., Detroit, Mich.

[21] Appl. No.: 425,211

[22] Filed: Sep. 28, 1982

[51] Int. Cl.⁴ .............................................. G09G 1/16
[52] U.S. Cl. ................... 340/748; 340/747; 340/731
[58] Field of Search ............... 340/731, 744, 748, 749, 340/750, 732, 735, 747

[56] References Cited

U.S. PATENT DOCUMENTS

| | | | |
|---|---|---|---|
| 3,928,845 | 12/1975 | Clark | 340/731 |
| 3,991,868 | 11/1976 | Robinson et al. | 340/731 |
| 4,231,096 | 10/1980 | Hansen et al. | 340/748 |
| 4,254,409 | 3/1981 | Busby | 340/731 |
| 4,342,096 | 7/1982 | McDevitt | 340/731 |
| 4,345,245 | 8/1982 | Velle et al. | 340/748 |
| 4,357,604 | 11/1982 | Imazeki et al. | 340/731 |

Primary Examiner—Gerald L. Brigance
Attorney, Agent, or Firm—Mervyn L. Young; David G. Rasmussen; Kevin R. Peterson

[57] ABSTRACT

Disclosed is a processor and method for the real time generation of linear arrays of pixel data. The generated pixel data is used to modulate a laser diode as it scans across a printing medium, thereby producing printed font and logo characters.

In accordance with the present invention, the real time processor receives a series of cell specifications on a scan line-by-scan line basis, the cell specifications identifying the font type and placement information. The real-time processor uses this information to access from its font memory a linear array of pixel data corresponding to the identified font type. The accessed pixel data is used to modulate the laser diode as it scans the printing medium line-by-line. Thus, as the laser diode is modulated by the pixel's "ones" and "zeros", it is pulsed "off" and "on", thereby generating pixel dots on the print medium itself or on a photosensitive drum which subsequently prints an image on a page through an electrostatic process.

7 Claims, 8 Drawing Figures

REAL TIME CELL SPECIFICATION PROCESSOR

BACKGROUND OF THE INVENTION

Cross Reference to Related Application

The present application is related to a copending application entitled REAL TIME GRAPHIC PROCESSOR by William Koos, Timothy Geis, and Richard M. Rudy which has been filed of an even date herewith, and which is assigned to the same assignee as the present application.

The latter application, which is incorporated herein by reference, describes a cell specification processor which can process graphic cell specifications to generate vector graphics, circles or any desired design.

OBJECT OF THE INVENTION

It is a general object of the present invention to provide a processor which generates character fonts and logos from cell specifications.

It is a further object of the present invention to provide a real time processor which includes a font memory for storing pixel cells representing particular characters and logos and means for retrieving the stored pixel cells.

It is an additional object of the present invention to provide a real time processor, which in response to the receipt of cell specifications, provides modulation signals to a laser diode to accomplish the printing of a scan line corresponding to the cell specifications received.

These and other objects of the present invention will become more apparent from reading the following detailed description in conjunction with the drawings.

SUMMARY OF THE INVENTION

In accordance with the present invention, a processor and method for the real time generation of linear arrays of pixel data is provided. The generated pixel data is used to modulate a laser diode as it scans across a printing medium, thereby producing printed font and logo characters.

In the preferred embodiment, a host provides an input processor with the font type and placement information necessary to generate the printed material. The input processor translates the received information into defined data structures. An intermediate processor receives these structures and generates a series of cell specifications which are ordered in accordance with the scan line in which they first become active. The cell specifications generated include a single entry specification identifying the pixel cell and where it is to be printed on the page. Cell specifications define a singular cell area (single entry), or unit cell areas that are image-repeated in either the vertical, or horizontal, or both (area) directions. The intermediate processor also supplies end of scan line, end of page and start of page cell specifications. The generated specifications are provided to a real time processor.

The real time processor generates from the received specifications a linear array of pixel data which is used to modulate a laser diode as it scans across a printing medium. Thus, as the laser diode is modulated by the pixel's "ones" and "zeros", it is pulsed "off" and "on", thereby generating pixel dots on the print medium itself, or on a photosensitive drum which subsequently prints an image on a page through an electrostatic process.

In accordance with the present invention, the real time processor includes a cell specification processor, a font memory controller, a font memory, and a dot line processor. The cell specification processor receives the cell specifications from the intermediate processor on a scan line-by-scan line basis and performs the following operations:

generates pixel data commands which describe the placement of pixel words to the dot line processor;

processes the cell specification until all the pixel words necessary to compose the cell for the particular scan line have been generated;

if necessary, reconstitutes a new cell specification to be used when processing the next scan line; and generates a font memory address command which is sent to the font memory controller and indicates the addresses of the pixel words to be retrieved from the font memory.

The font memory controller retrieves the indicated pixel word from the font memory and transmits the retrieved information to the dot line processor. The dot line processor also receives (from cell specification processor) a pixel word command indicating how many of the bits in the received pixel word are to be utilized and a command indicating where along the scan line the particular pixel word is to be placed.

The dot line processor receives similar information and commands for each cell specification processed and assembles groups of these pixel words into a complete scan line. Then, at the moment the laser diode scans across the corresponding scan line, the dot line processor utilizes the assembled information for that scan line to modulate the laser diode thereby producing a scan line image corresponding to the assembled information.

DETAILED DESCRIPTION OF THE PREFERRED EMBODIMENT

Figure 1:
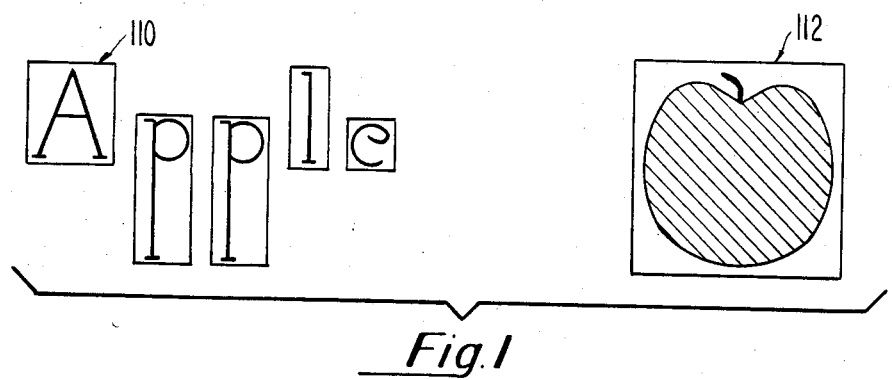
FIG. 1 is a highly stylized schematic illustration of a typical font and logo for the present invention.

FIG. 1 shows typical font and logo characters which are processed by the invented real time processor. Each character or font is described in terms of a pixel cell. A pixel cell contains a two dimensional array of ones and zeros which are needed to generate the desired font character or logo. In FIG. 1 the pixel cell is represented by a box around the desired character or logo, i.e., the pixel cell for the character "A" 110 and the pixel cell for a typical logo 112 are shown. As shall later be described, the actual two dimensional array of ones and zeros which characterize a particular pixel cell is stored in the font memory. The pixel cell is retrieved by the processing circuit when the particular character or logo is to be printed. The pixel cells vary in size—a pixel cell containing the information necessary to print a form could be as large as an entire page, whereas, a pixel cell containing the information necessary to print a comma or dot would be only a few scan lines high and only a few dots wide. It is, however, desireable that for a particular character or font, the pixel cell tightly surrounds the active elements being printed, thus avoiding the processing of unnecessary pixel data. Once the particular pixel cell has been retrieved from the font memory it is within the capability of the invented processor to rotate the pixel cell by 180° to allow printing from page top to bottom or bottom to top.

Figure 2:
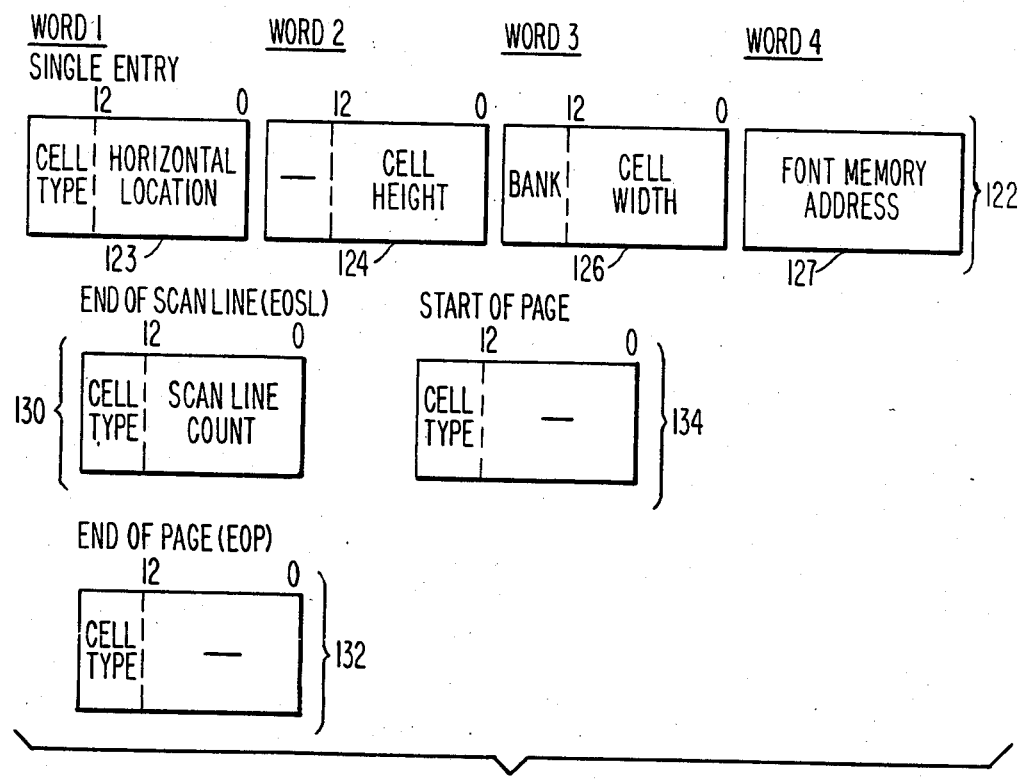
FIG. 2 illustrates four types of cell specifications utilized by the present invention.

In an effort to reduce calculation time, the processor does not need to handle the array of ones and zeros contained in each pixel cell until the end of the process—where the actual video signal is compiled. It instead, deals with cell specifications which describe where the particular pixel cell can be found in font memory, what size the pixel cell is, how many times the cell is to be repeated, and where it is to be printed on the page. FIG. 2 shows four types of cell specifications which are processed by the system of the present invention. The single entry cell specification 122, contains four 16 bit words. The end of scan line cell specification 130, end of page cell specification 132, and start of page cell specification 134 each contain one 16 bit word. The end of scan line, end of page and start of page cell specifications do not describe the placement of a particular pixel cell, they are however, used to initialize the system at the beginning of each page and at the end of a scan line. The single entry cell specification 122 is used to identify the pixel cell and to describe where it is to be printed on the page. The cell spec type identifier 121 is contained in the four most significant bits of the first word of the cell specification. It tells the real time processor what type of cell specification is being processed. The horizontal location identifier 123, is contained in the lower 12 bits of word one of a single entry cell specification and indicates the number of dots the left hand side of the pixel cell is displaced from the left hand margin. The cell height indicator 124, is contained in word two, and describes the vertical height of the pixel cell in terms of the number of scan lines necessary to generate the particular pixel cell. The bank identifier 125, is contained in the four most significant bits of word three, and describes which memory bank within font memory is to be accessed. The cell width identifier 126, is found in the 12 lower bits of word three, and defines the width of the pixel cell in dots. A single entry cell can be up to 4,096 dots wide, i.e., the width of a page. The font memory address indicator 127, is contained in word four, and describes to the real time cell spec processor where in font memory the pixel information for the particular pixel cell is stored. The cell width identifier 126 specifies the width of the cell in terms of font memory words, e.g., a cell width of one would mean the cell is one font memory word wide or 16 bits wide.

Figure 3:
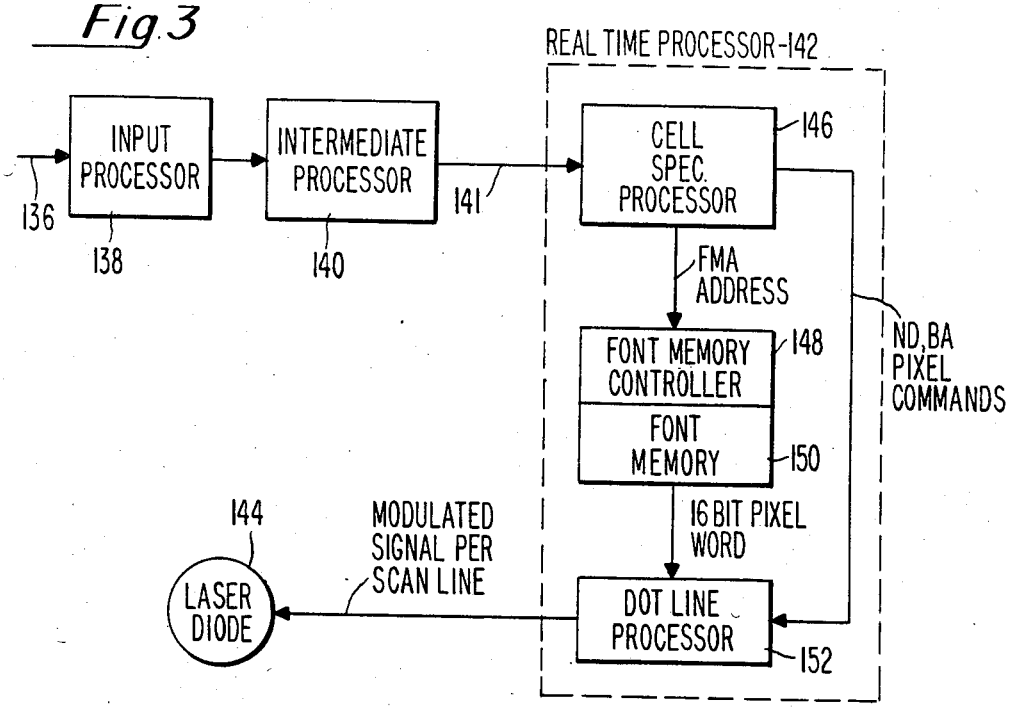
FIG. 3 is a block diagram of the system of the present invention.

The overall processing system is shown in FIG. 3. A host 136 communicates with the input processor 138 and supplies the font type and placement information necessary to generate the printed material. The input processor 138 receives this information and translates it into defined data structures. The intermediate processor 140 receives these structures generated by the input processor 138 and generates a series of cell specifications by their scan line of first appearance, e.g., cell specifications are ordered in the scan line in which they first become active. The intermediate processor 140 also supplies the start of page, end of page, and end of scan line commands at their appropriate locations. The ordered cell specifications are sent along buss 141 to the real time processor 142, which in real time, generates a linear array of pixel data, which is used to modulate the laser diode 144 as it scans across the printed media. As the laser diode 144 is modulated by the pixel ones and zeros, it is pulsed "off" and "on", thereby generating pixel dots on the printed material itself or on a photosensitive drum which subsequently prints an image on a page through an electrostatic process.

The novel features of the invented system can be found in the real time processor 142. The real time processor 142 contains a cell specification processor means 146, a font memory controller means 148, a font memory means 150, and a dot line processing means 152. The cell specification processor 146 receives the cell specification string from the intermediate processor 140 on a scan line by scan line basis, and performs the following operations: (A) generates pixel data commands which describe the placement of pixel words to the dot line processor means 152 in terms of the number of bits (ND) of pixel data generated, and its horizontal displacement along the scan line (BA); (B) processes the cell specification until all the pixel words necessary to compose the cell for the particular scan line have been generated; reconstitutes and recirculates a new cell specification to be used when processing the next scan line after testing to determine whether the cell specification will continue to remain active on the next scan line; (C) generates a font memory address command which is sent to the font memory controller 148 and indicates the addresses of the 16 bit pixel words to be retrieved from font memory 150. The font memory controller 148 retrieves the 16 bit pixel word from the font memory 150 and transmits this information to the dot line processor 152. The dot line processor 152 receives the pixel word command (ND) indicating how many of the 16 bits are to be used, and the command (BA) indicating where along the scan line the particular 16 bit pixel word is to be placed. The dot line processor 142 receives similar information from every cell specification processed on a particular scan line, and assembles a plurality of these 16 bit pixel words into a completed scan line. At the moment when the laser diode 144 scans across a particular scan line the dot line processor 152 will release its information and modulate the laser diode.

Figure 4:
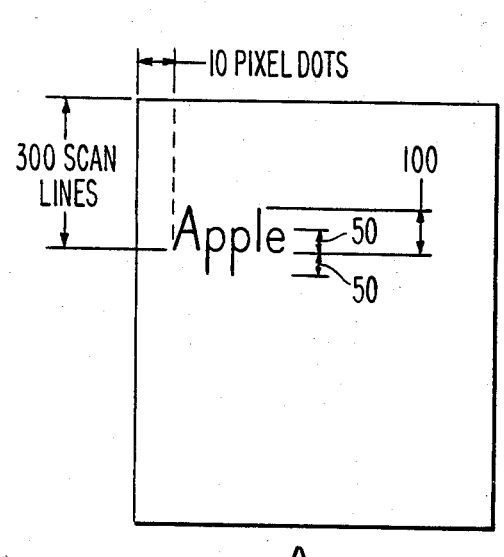
FIG. 4A illustrates the dot displacement and scan displacement employed in the present invention.
FIG. 4B illustrates the cell specification string generated by the input and intermediate processors of the present invention.

The operation of the input processor 138 and the intermediate processor 140 might best be described by a simple example. FIG. 4A shows the word "apple" printed on a page and describes the placement of the characters in terms of dot displacement in the horizontal plane, and scan line displacement in the vertical plane. FIG. 4B shows the string of cell specifications generated by the input processor and the intermediate processor which is sent to the real time processor 142 and will result in "apple" printed on the page, as shown in FIG. 4A. The first cell specification in the string is an start of page (SOP) cell specification, which tells the real time processor that a new page is to be processed. Since no cell specification becomes active for the first 200 scan lines, a series of 200 end of scan line (EOSL) cell specifications are produced. The cell specification for the font "1" is the first single entry cell specifications to become active. Since these characters are the only pixel cells to become active on this scan line it is followed by an EOSL spec. For the next 50 scan lines no additional cell specifications become active. The intermediate processor therefore generates 50 end of scan line (EOSL) cell specifications. On scan line 250, pixel cells "p", and "e" become active and their cell specifications are placed in the string generated by the intermediate processor. Since no additional cell specifications are needed to produce the page, an end of page (EOP) cell specification is generated. The series of cell specifications depicted in FIG. 4B are generated by the input processor 138 and the intermediate processor 140 and sent to the real time processor 142.

Figure 5:
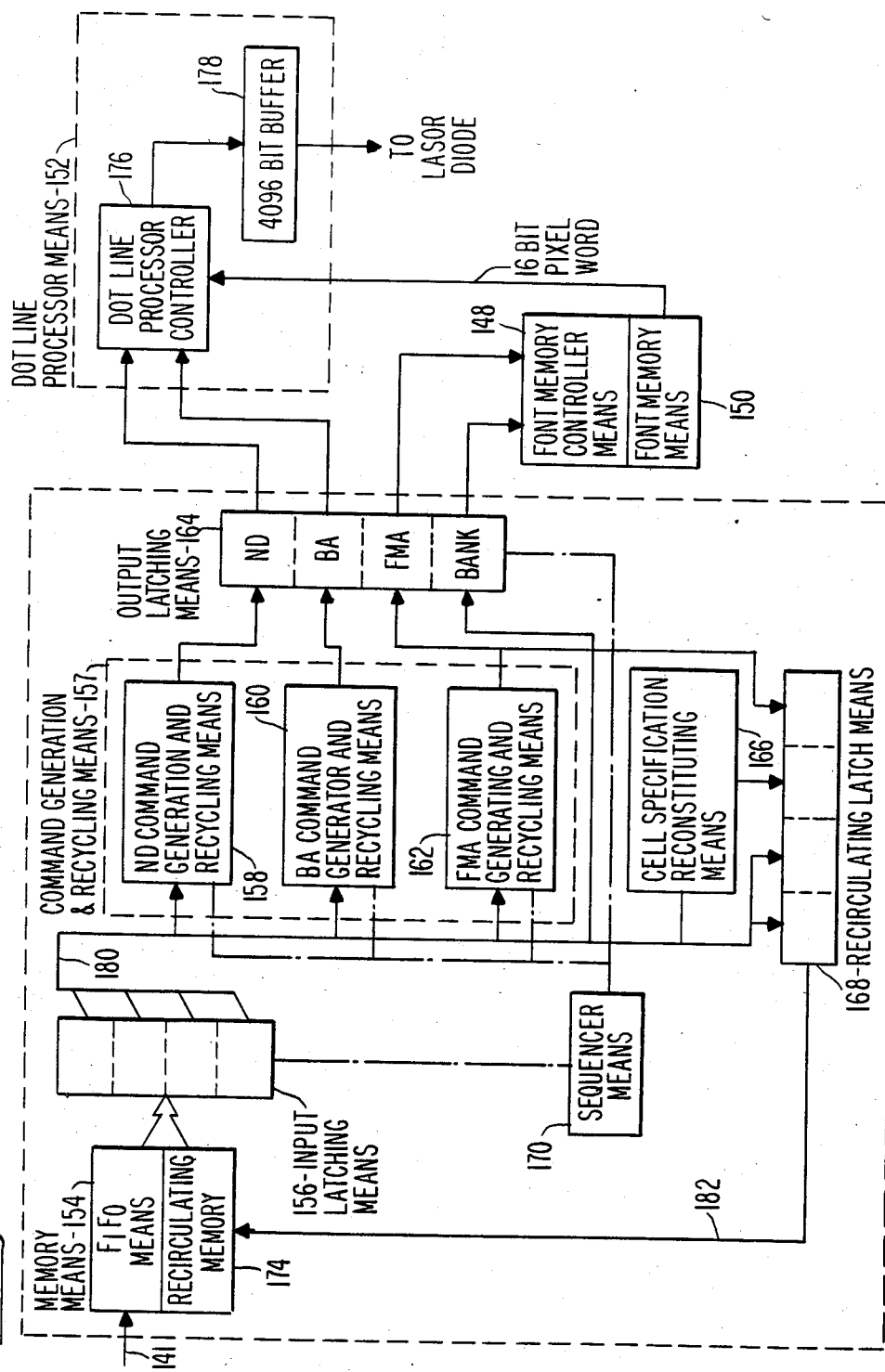
FIG. 5 is a block diagram of the real time processor for the present invention.

FIG. 5 shows the real time processor in block diagrammatic form. The real time processor is generally composed of: a memory means 154, an input latching means 156, a command generation and recycling means 157 (which further includes: a ND command generation and recycling means 158, a BA command generator and recycling means 160, a FMA command generating and recycling means 162), an output latching means 164, a cell specification reconstituting means 166, a recirculating latch means 168, a font memory controller means 148, a font memory means 150, a dot line processing means 152, and a programmed sequencer means 170. The memory means 154 further consists of a FIFO memory 172 and a recirculating memory 174. The dot line processing means 152 further contains a dot line processing control 176 and a 4,096 bit buffer 178.

In operation, a series of cell specifications are received from the intermediate processor along buss 141 and are loaded in sequence into the FIFO memory means 172. The cell specifications which are to be processed for a particular scan line are loaded from the FIFO memory means 172 or the recirculating means 174, one at a time, into the input latching means 156. The particular cell specification, which is latched into the input latching means 156, is processed in real time by the rest of the real time cell specification processor. The latched cell specification is reconstituted and recirculated back to the recirculating memory means 174 where it can be processed on the next scan line. The identifier values, from the latched cell specification, travels along buss 180 to the command generator and recycling means 157. The ND generating and recycling means 158 looks at various identifiers in the latched cell specification and produces as an output a command indicating the number of bits which are to be processed from a 16 bit pixel word. The BA command generation and recycling means 160 receives the latched cell specification identifiers along buss 180 and produces as an output the horizontal displacement of the 16 bit pixel word along the scan line. The FMA command generation and recycling means 162 receives identifier information along buss 180 and provides the address for the generated 16 bit pixel word in font memory. If a particular cell specification is more than 16 pixel dots in width, the cell specification is recirculated within the command generation and recycling means 157, until all the 16 bit pixel words necessary to describe that cell specification for the particular scan line are produced. On each of the cycles, the output latching means 164 is loaded with values indicating the number of dots useful in the 16 bit word (ND), the bit address or horizontal location of the 16 bit pixel word along the scan line (BA), the address in font memory of this 16 bit pixel word (FMA), and the memory bank locations in which the pixel cell is to be found. The FMA address and the bank address commands are sent to the font memory controller 148. Font memory controller 148 searches into the font memory 150, locates the particular 16 bit pixel word and transmits all 16 bits to the dot line processing means 152. Commands ND and BA are sent to the dot line processing controller 176. The dot line processing controller 176 loads the significant bits of the 16 bit pixel word into the correct location in the 4,096 bit buffer 176. When the bit buffer 178 has been loaded with all the pixel words necessary to generate the particular scan line (for each of the cell specifications active on that scan line), the pixel data is released and modulates the laser diode as it scans across the page. After the particular cell specification, latched in the input latching means 156 has been processed and recycled by the three command generating and recycling means 157, it is necessary to test the cell specification to see whether or not it remains active on the next scan line. If the latched cell specification remains active on the next scan line it must be reconstructed to contain some new identifiers. The cell specification reconstituting means 166 generates the new identifiers needed for the next scan line. The recirculating latching means 166 is then loaded with several old identifiers from buss 180 with several modified identifiers from the cell specification reconstituting means 166. The reassembled cell specification is sent along buss 182 and stored in the recirculating memory 174 for processing on a subsequent scan line. A sequencer means 170 controls the timing in the input latching means 156, the output latching means 164, the recirculating latching means 168 and regulates the operation of the command generating and recycling means 157 and the cell specification reconstituting means 166.

Figure 6:
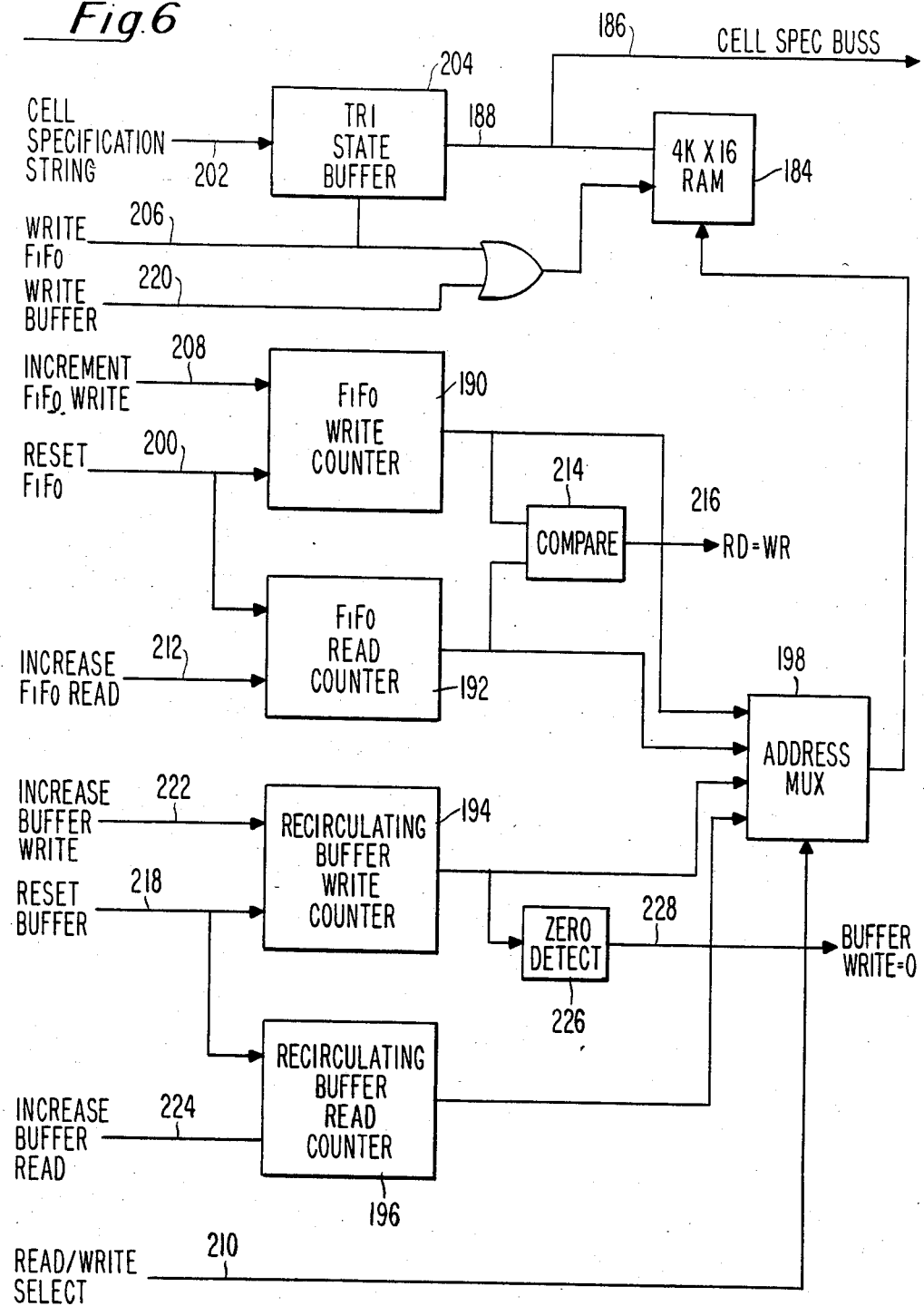
FIG. 6 is a block diagram of the cell specification memory of the present invention.

FIG. 6 shows, in diagrammatic form, the cell spec memory means 154. A 4K×16 RAM memory 184 contains both the FIFO memory 172 and the recirculating memory 174 (see FIG. 5). The recirculating memory occupies the lower 1K word positions and the FIFO memory occupies the upper 3K word positions. Cell specifications are read into or out of the RAM 184 through the 16 bit bi-directional buss 186 and the 16 bit buss 188. Placing both FIFO memory and recirculating memory on the same RAM produces an extremely efficient use of memory space but necessitates an address mux 198 that selects between a series of counters 190, 192, 194, and 196, that act as pointers when addressing either the FIFO or recirculating memory.

The FIFO write counter 190 and the FIFO read counter 192 are reset by command signal 200. Cell specs are sent from the intermediate processor along a 16 bit buss 141 to a tristate buffer 204 and then are read into the RAM 184 when the FIFO write command signal 206 is received. As each word is read into the memory, the FIFO write counter 190 is incremented by command signal 208 so that the next word is read in at the next address. When the address mux 198 receives a read command 210 the FIFO read counter 192 acts as a pointer. The FIFO read counter 192 is increased by command signal 212 in the same manner as the FIFO write counter. The result is a recirculating buffer, with the read address pointer sequentially following the write address pointer. A comparator 214 receives address signals from the FIFO write counter and the FIFO read counter and makes a comparison. If the read and write address are equal, it means the write pointer has recirculated completely around and that there is no room available to write additional cell specs. Control signal 216 is sent to the intermediate processor telling it to hold back on the cell specification generation.

When an end of scan line cell (EOSL) specification is processed, the write 194 and read 196 counters are reset by command signal 218. The cell specs to be stored in the recirculating memory are inputed by the bi-directional buss 186 when the recirculating write command signal 210 is received. As each word of the cell specification is read into memory, the recirculating write counter is incremented by command signal 222 so that the next word is read in at the next address. The recirculating memory is read when the address mux 198 receives a read command 210. The recirculating read counter 196 is increased by command signals 224 in the same manner as the write counter. In effect, the counters 194 and 196 act as pointers, addressing the recirculating memory in the serial manner. A zero detector 226 receives address signals from the recirculating write counter and produces a command signal 228, which tells the sequencer whether a cell specification has been addressed into the recirculating memory during the particular scan line.

In operation, a string of cell specifications are received from the intermediate processor along buss 141 and loaded into the RAM 184 memory. As noted previously, the cell specifications from the intermediate processor are presented in order of scan line of first appearance, i.e. all cell specifications which become active for one scan line are received before cell specifications which become active for the next scan line. Both the recirculating buffer 174 and the FIFO memory 172 (see FIG. 6) are physically located in the RAM 184. At the beginning of each new scan line, the recirculating buffer 174 is checked to determine if any cell specifications were recirculated from the previous scan line. If no cell specifications were recirculated, the cell specifications from the current scan line are read, one at a time, from the FIFO memory 172 and sent along the cell specification buss 186. If cell specifications were recirculated, the cell specifications are read, one at a time, from the recirculating buffer 174 and sent along cell specifications buss 186 until an end of scan line (EOSL) specification is encountered in the FIFO memory. (An end of scan line (EOSL) specification is generated by the intermediate processor and placed in the cell specification chain in such a manner as to indicate the completion of the scan line.) When the end of line cell (EOSL) specification is encountered in the FIFO memory 172, and all the cell specifications for the current scan line have been read and operated on by the cell specification processor then the above mentioned cycle starts again and processes the next scan line. It should be noted, that cell specifications are read one at a time from the RAM 184, and a particular cell specification is completely processed by the cell specification processor before the next cell specification is read from the RAM 184.

Figure 7:
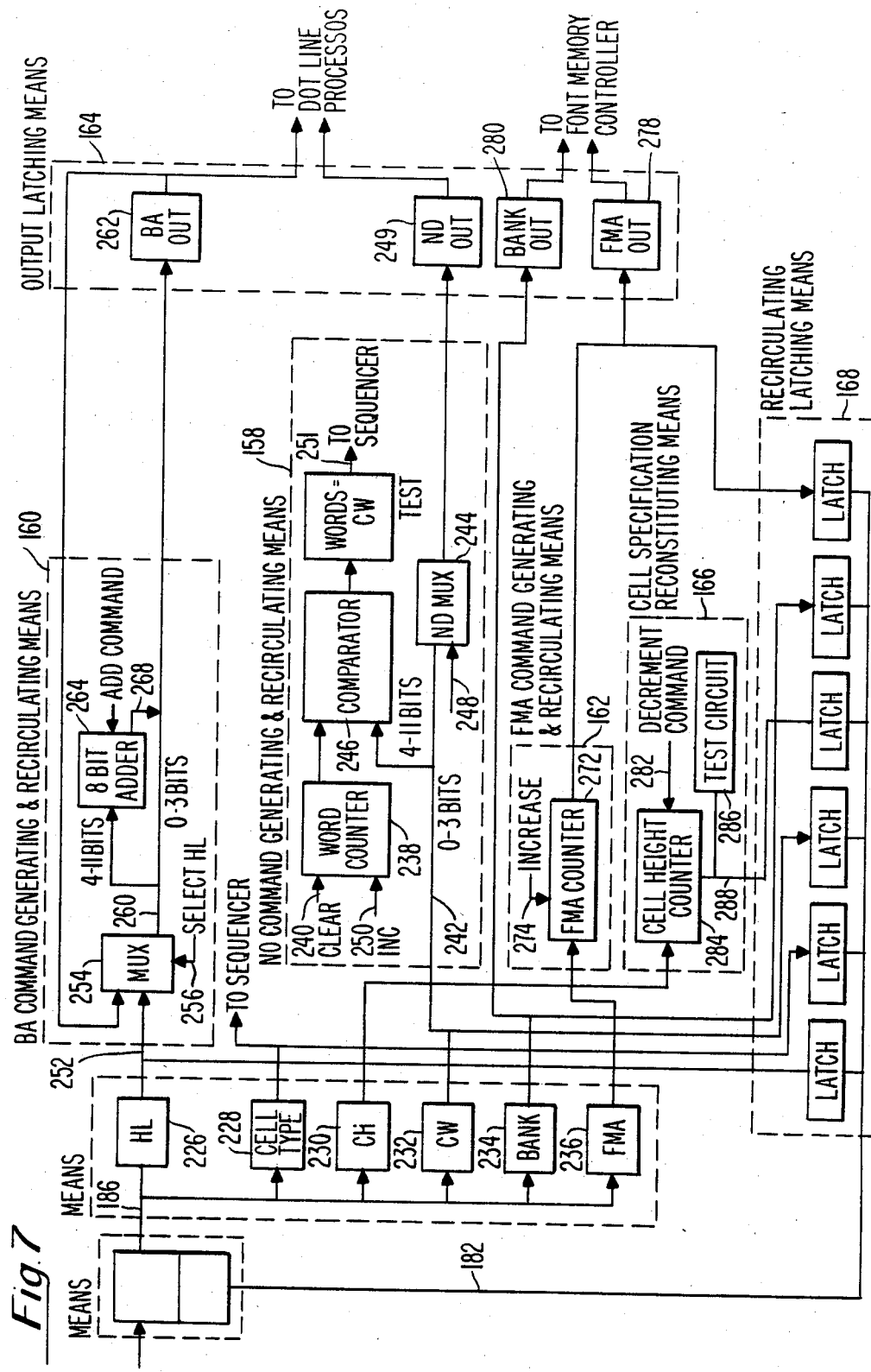
FIG. 7 is a block diagram of a typical cell specification processor for the present invention.

FIG. 7 shows, in block diagrammatic form, a specific embodiment of the cell specification processor which is used to process single entry type cell specification. The four 16 bit words, which comprise the single entry cell specifications, travel from the RAM memory 184 along cell specifications buss 186 and are latched, one at a time, into the input latching means 156. The particular cell specification latched in input latching means 156 is then processed by the rest of the cell specification processor and recirculated. Bits 0-11 of word one, which contains the horizontal position information, is latched into the horizontal position latch 226. Bits 12-15 of word one, which contains the cell type information, is latched into latch 228. Bits 0-11 of word two, which contains cell height information, is latched into cell height latch 230. Bits 0-11 of word three, which contain cell width information, is latched into cell width latch 232. Bits 12-15 of word three, which indicates the bank address, is latched into memory bank latch 234. All 16 bits of word four, containing the font memory address, is latched in FMA latch 236.

Once the cell specification indicators are latched into the input latching means 156, the rest of the cell specification processor circuitry generates output commands identifying the address of a particular pixel word in font memory. specifying where in the scan line that particular pixel word is to be placed. The processing of the latched cell specification for one particular scan line can result in a whole series of pixel command identifying pixel words and determining their location in the scan line. As discussed previously (see FIG. 5), there are three command generating and recirculating means 158, 160, and 162 which have the function of processing and recirculating the cell specification until all the pixel words and associated location commands have been derived from the latched cell specification. Once all the pixel words necessary to describe the latched cell specification for the current scan line have been generated, a cell specification recirculating means 166 recalculates certain of the cell specification identifiers so that the cell specification can be used for a subsequent scan line. The reconstituted cell specification is tested to determine whether it remains active on the subsequent scan line and is assembled in the recirculated latching means 168. After the modified cell specification is recirculated in the recirculating latching means 168, it is sent along buss 182 and stored in the memory means 154 until the next scan line is processed.

The ND command generating and recirculating means 158 processes the cell width identifier loaded in cell width latch 232, and produces the ND pixel command which is placed in latch 248. The ND pixel command tells the dot line processor how many bits of a particular 16 bit word are to be used. At the start of the sequence the word counter 238 is cleared to zero by clearing command 240. A 12 bit buss 242 running from the cell width latch 232 is split such that bits 0-3 run to the ND mux 244 and bits 4-11 run to the comparator 246. The cell width indictor is arranged so that the upper eight bits indicate the number of pixel words contained in the cell word; the lower four bits indicate how many bits of the last pixel word are to be used. Comparator 246 now tests the upper eight bits from buss 242 to see if it equals the value read from the word counter 238. If the test is positive, the sequencer sends a select signal 248 to the ND mux 244. The ND mux has two channels to switch between: (1) the first channel is set so that it produces a value of 16: and (2) the second channel, connected to the lower four bits of buss 242, indicates how many bits in the last word are to be used. Only when select signal 248 is received will the ND mux 244 switch from its first channel to its second channel, thereby indicating that less than the full 16 bits of the pixel word are to be used. Output from the ND mux 244 runs to the ND out latch 249 and will later be sent to the dot line processor. After the first pixel word is generated, the sequencer sends a command 250 to word counter 240 to increase its value by one. A test is again made by the comparator 246 to determine if the value in the word counter 238 equals the upper eight bits of the cell width parameter. The sequence continues to run until a positive result is produced. When the test is positive, a signal 251 is sent to the sequencer telling it that no additional pixel words generated from this cell specification are needed for the scan line currently being processed. It also tells the sequencer to activate the select command 248 at the ND mux 244.

The BA command generating and recycling means 160 operates on the indicator value in the horizontal position latch 226 and produces the bit address (BA) pixel command which tells the dot line processor where to place the pixel word along the scan line. Bits 0–11 of word one, which are latched in the horizontal position latch 226, run along a 11 bit buss 252 to mux 254. Mux 254 initially receives the command 256 from the sequencer to select this channel (buss 252). Without this command the mux 254 will normally select the other channel (buss 258). Buss 260 runs from mux 254 and is split such that the lower four bits run directly to BA out latch 262 and the upper eight bits runs to the eight bit adder 264. Output signal 268 from the eight bit adder 264 rejoins buss 260 and continues to the BA out latch 262. Feedback loop 258 branches just after the BA out latch 262 and returns the value to the second channel of mux 254. An add command 270 from the sequencer tells the eight bit adder 264 to add zero and force a carry to the adder which in effect adds 16 to the previous bit address. The bit address command (BA) for the first pixel word generated will be the horizontal position indicator obtained directly from the horizontal position latch 266. This is achieved by activating the select command 260 at mux 254. The bit address (BA) for the next pixel word generated from this cell specification, will be obtained by increasing the last bit address by 16. To achieve this the select command 256 is not sent to mux 260 and it selects buss 254 which feeds the previous bit address (BA) to the eight bit adder 264. The eight bit adder 264 receives an add command 270 from the sequencer, increasing the value fed to it from buss 258 by 16, and outputs through buss 260 and buss 268 to the BA out latch 262. This process is continued for each pixel word generated by the particular latched cell specification for the scan line being processed.

The FMA command generating and recirculating means 162 increments the font memory address to produce a pixel command signal FMA out. This tells the font memory controller 148 (see FIG. 6) where in the font memory 158 to retrieve the particular pixel word being identified during this cycle of processing the cell specification. As has been mentioned earlier, word four of the cell specification contains the starting address for pixel data used to generate the cell. This 16 bit address is loaded into the FMA counter 272 and for each pixel word the value is incremented. The incremented value travels along buss 276 to the FMA out latch 278.

In addition to the three command and recirculating means 158, 160 and 162 described above, additional identifiers loaded in the input latching means 156 are also evaluated. The bank identifier, which identifies the particular memory bank in font memory 150 which contains the pixel cell, is placed in input latch 234. For each pixel word generated when processing the cell specification the bank value is placed in bank output latch 280. The cell type identifier is also evaluated and is loaded in cell type latch 228. The cell type identifier inputs directly to the sequencer and tells the sequencer what type of cell specification is being processed.

The three command generating and recirculating means 158, 160 and 162 operate on the identifiers loaded in the input latching means 156 and generate a BA out, ND out, bank out, and FMA out pixel command which is stored in the output latching means 156. The values in the output latching means 156 tell the dot line processor where to place a particular 16 bit pixel word and tells the font memory controller where in font memory to retrieve the particular 16 bit pixel word. As has been described above, the cell specification is recirculated by the three command generating and recirculating means 158, 160 and 162, and with each cycle a new pixel word is produced and new pixel command signals are placed in the output latching means 164. This process continues until the comparator 264 has determined that the last pixel word necessary to describe the latched cell specification, on the particular scan line has been processed.

After all the pixel words have been generated, it is necessary for the cell specification reconstituting means 166 to generate new identifiers so that the cell specification can be used when processing a subsequent scan line. The cell spec reconstituting means 166, contains a cell height counter 284 and a test circuit 286. The cell height latch 230 latches bits 0–11 of word two which contain the cell height expressed in the number of dots. At the completion of each scan line, decrementing command signal 282 is sent to the cell height counter 284. (The decrementing command signal 282 is sent after the test by comparator 246 has determined that the last pixel word for the scan line is being processed) The decremented cell height value is then tested by testing circuit 286. If the cell height value is zero the cell specification will not be recirculated; if it is greater than zero, the cell specification will be recirculated for additional processing on a subsequent scan line. Buss 288 carries the new cell height identifier to the recirculating latching means 168. The identifiers for bank, cell width, cell type, and horizontal location run directly from the input latching means 156 to the recirculating latching means 168. The font memory address (FMA) runs from the FMA counter 272 along buss 290 to the recirculating latching means 168. The modified cell specification, which has been assembled in the recirculating latching means 168, is sent along buss 182 to the memory means 154 if the testing logic 268 indicates that the cell specification remains active for processing on a subsequent scan line.

What is claimed is:

1.

A real time processor which generates the pixel data necessary to print character fonts and logos, having an initial processor which translates information from a host into a string of cell specifications placed in order of scan line of first appearance, said cell specifications having horizontal location, cell height, font memory bank address, cell width and font memory address identifiers, said real time processor generating pixel data on a scan line-by-scan line basis, comprising:

a memory means for storing said string of cell specifications produced by said initial processor;

an input latching means, connected to said memory means, for latching a particular cell specification while it is being processed for the current scan line;

a command generating and recycling means, connected to said input latching means, for processing the latched cell specification and for generating pixel word commands for each pixel word comprised of pixel bits used to compose said current scan line, each of said pixel word commands indicating the font memory address, the number of pixel bits required by the latched cell specification, and the location along the scan line for each of said pixel words;

a cell specification reconstituting means connected to said input latching means, for decreasing the cell height indicator by one, and for testing to determine if said latched cell specification remains active on the next scan line;

a recirculating latch means, connected to said cell specification reconstituting means, said input latching means, and said command generation and recycling means for reconstructing a modified cell specification to be recirculated back to said memory means after said command generation and recycling means has completed processing said latched cell specification for said current scan line;

a font memory means to receive said pixel word commands from said command generation and recycling means for retrieving said pixel words comprised of pixel bits needed to compose the character font or logo represented by said latched cell specification; and, a dot line processing means to receive said pixel word command from said command generating and recycling means and said pixel words comprised of pixel bits from said font memory means, for assembling a complete scan line of pixel data, said completed scan line of pixel data to be released to modulate a printer after all the cell specifications active on said current scan line have been processed.

2. The apparatus of claim 2 wherein said command generating and recycling means further comprises:

a number of bits command generating and recycling means, receiving as input said cell width identifier from said input latching means, for generating a command indicating the required number of bits in each of said pixel words, and for determining when all of said pixel words for said latched cell specification have been generated for said current scan line;

a bit address command generation and recycling means, receiving as input said horizontal location identifier from said input latching means, for generating a command indicating the location of each of said pixel words along said scan line: and, a font memory address command generating and recycling means, receiving as input said font memory address identifier from said input latching means, for generating a command indicating the address in said font memory means for each of said pixel words, and for producing a new font memory address identifier at the end of each scan line.

3. The apparatus of claim 2 wherein said cell specification reconstituting means comprises:

a decrementor, which receives as input said cell height identifier from said input latching means and decreasing said cell height value by one when said latched cell specification has been processed for said current scan line; and, a testing circuit, connected to said decrementor, to determine if said latched cell specification will remain active on the next scan line and whether it should be reconstituted in said recirculating latching means.

4. The apparatus of claim 2 or 3 wherein said font memory address command generating and recycling means further comprises:

a counter, which receives as input said font memory address identifier from said input latching means, for incrementing said font memory address for each of said pixel words generated.

5. The apparatus of claim 2 or 3 wherein said number of bits command generating and recycling means further comprises:

a word counter, which counts the number of said pixel words generated from said latched cell specification;

a comparator, which receives values from said word counter and said input latching means, and determines when the last pixel word generated from said latched cell specification for said current scan line is being processed; and, a multiplexer, connected to said input latching means and associated with said comparator, for determining the number of useful bits in each of said pixel words by switching, when processing said last pixel word, from a command signal indicating all pixel bits are significant to a command signal indicating only that number of bits specified in said cell width identifier are significant.

6. The apparatus of claim 2 or 3 wherein said bit address command generating and recycling means further comprises:

an output latch, which stores said pixel word command indicating location along said scan line, calculated during generation of the last pixel word;

an adder connected to said output latch to add a pixel word length to the location value stored in said output latch; and, a multiplexer, connected to said input latching means and said adder to output a command indicating the location of each of said pixel words along said scan line by selecting the value of said horizontal location identifier for the first pixel word and selecting the value from said adder for all other pixel words generated from said latched cell specification in said current scan line.

7. A method for generating, in real time, the pixel data necessary to print character fonts and logos, having an initial process which translates information from a host into a string of cell specifications which are placed in order of scan line of first appearance, said cell specifications having horizontal location, cell height, font memory bank address, cell width and font memory address identifiers, said method generating pixel data on a scan line-by-scan line basis comprising:

latching, one at a time, each of said cell specifications while said latched cell specification is being processed for the current scan line;

generating pixel word command for each pixel words comprised of pixel bits bits needed to compose the particular character font or logo represented by said latched cell specification in said current scan line, said pixel word commands indicate the font memory address, the number of required pixel bits, and the location along the scan line for each of said pixel words;

retrieving each of said pixel words identified by said pixel word command;

assembling a complete scan line of pixel data by placing each of said retrieved pixel words in the correct location along said scan line as indicated by said pixel word command;

transmitting said assembled scan line of pixel data to modulate the printing of said character fonts and logos after all the cell specifications active on said current scan line have been processed;

calculating new values for said cell height and font memory address identifiers which would be needed to continue processing said latched cell specification on a subsequent scan line;

reconstructing a modified cell specification having said new cell height and font memory address identifiers and said original horizontal location, bank address, and cell width identifiers; and, determining if said modified cell specification remains active on the next scan line and then recirculating said modified cell specification to be processed on the next scan line.

* * * * *